Dec. 5, 1939.  C. E. BURKE  2,182,013
MOLD FOR FORMING SOLDER BARS
Filed March 30, 1936
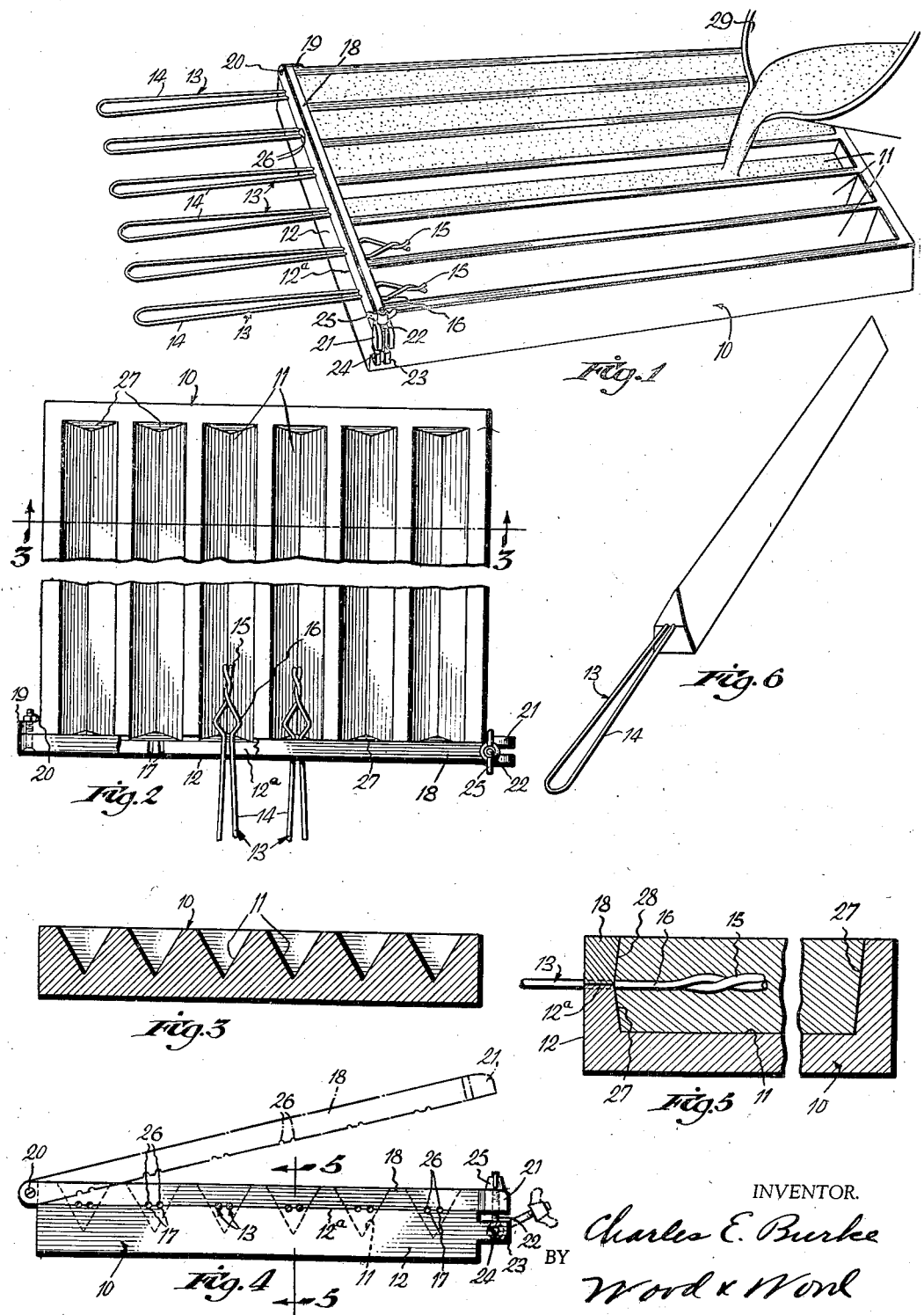
INVENTOR.
Charles E. Burke
BY Word & Word
ATTORNEYS Patented Dec. 5, 1939

2,182,013

UNITED STATES PATENT OFFICE 2,182,013

MOLD FOR FORMING SOLDER BARS

Charles E. Burke, Ludlow, Ky.

Application March 30, 1936, Serial No. 71,541

5 Claims. (Cl. 22—121)

This invention relates to the art of soldering, and is particularly directed to improvements in the structure of the mold for forming the solder in bars.

The conventional solder bar is of round or square transverse cross section, approximately 8 or 10 inches long. The operator, in applying the solder to a given job, holds the solder in one hand and applies the soldering iron or the flame of a blow torch to the outer end thereof.

Large quantities of solder are used today in the art of filling dents in the metal parts of an automobile such as the fenders. The usual practice is to pound out the dents whenever this can be done, bringing the surface back to its original form as nearly as possible. In some cases it is not possible to remove the dents, and the depressions are filled with solder. It will be appreciated that this method of rebuilding metal surfaces requires the application of a great deal of solder.

For quick application a blow torch is used to melt the solder. Since solder is a good conductor of heat, it follows that heat travels rapidly along the bar which makes it impossible for the operator to hold the same after the bar has become shortened to within certain limits. Moreover, the flame must be directed dangerously close to the hand.

It has been the object of the present inventor to provide a mold for forming a solder bar with holding means at one end thereof. More specifically, it has been the object to provide a mold which incorporates means for molding the bar with the holding means formed as a rigid or substantially integral part of the bar. It is then possible for the operator to use all of the material of the bars thus formed without discomfort or danger of burning and the holding means may be re-used if desired.

It has been the practice to make these bars either of round, square, or oval cross section. The present inventor has discovered that less rotation is required of a bar which is triangular in cross section. Heating of the solder and melting can be accomplished much more quickly when the bar is triangular, since the flame can then be directed toward one of the three edges and against two of the three faces. In other words, it may be stated that the center of the mass is more quickly reached in a triangular bar than it is in a round or square bar, and with a minimum of manipulation.

Other objects and further advantages will be more fully apparent from a description of the accompanying drawing, in which:

Figure 1 is a perspective view of the mold in which the solder bars are poured, showing the operation of forming the bars.

Figure 2 is a top plan view of the mold with a portion thereof broken away.

Figure 3 is a sectional view, taken on line 3—3, Fig. 2, illustrating the cavities of the mold in transverse section.

Figure 4 is an end view of the mold, illustrating the device for holding the respective handles or holding means in position during the operation of pouring the bars.

Figure 5 is a sectional view taken on line 5—5, Fig. 4, detailing the attachment of the holding means and the bar.

Figure 6 is a perspective view of a finished bar.

Referring to the drawing, the mold is generally indicated at 10. It is of rectangular form, incorporating a series of parallel mold cavities 11. As shown in Figure 3, these cavities are V-shaped to provide bars of triangular cross section.

The forward wall 12 of the mold is of less height than the other walls, its upper surface 12ª being disposed in the same plane with the axes of the mold cavities and therefore with the mass centers of the bars poured in the cavities. The holding elements 13 are mounted in relation to this forward wall. The holding devices consist, in each case, of a length of wire bent upon itself to provide a handle end, as at 14, and having its ends twisted together as at 15. The length of wire is spread apart, as at 16, at adjacent points in order to provide an enlargement located within the poured solder for preventing easy displacement of the handle.

The upper surface 12ª of the end wall 12 is grooved, there being a pair of notches or grooves 17 for each handle adjacent each mold cavity. A clamping bar 18 is hinged to a flange 19 of the side wall of the mold on a pivot pin 20. The other end of the bar 18 is adapted for fastening, being bifurcated as at 21.

A clamping bolt 22 is pivoted on a lug 23 projected from the end wall 12. This lug 23 is bifurcated and the clamping bolt has an eyelet end rotatively mounted on a pin 24 disposed between the arms of the bifurcated lug. As shown in Figure 4, the draw bolt can be swung up between the arms of the bifurcated end of the clamping bar 18, and a wing nut 25 on the bolt drawn down against the clamping arm.

The clamping arm 18 includes notches or grooves 26 registering with the grooves 17 in the end wall. Thus the handle elements 13 can be held rigidly in place in these notches 17, 26, during the operation of pouring the solder into bars by clamping the elements between the bar 18 and the end wall 12 of the mold.

The end surfaces 27 of the mold cavities are inclined (see Figure 5) to provide ample draft for removal of the bars after pouring. In the same way the bar 18 has its inner surface 28 inclined in a reverse direction, for purposes of draft, whereby the bar 18 can be raised easily after the pouring of the solder bars.

After the handle elements have been clamped in position with their inner ends projecting into the mold cavities centrally thereof, the solder is poured into the molds from a vessel 29 (see Figure 1). After the solder has cooled, the bar 18 is unclamped and lifted, and each solder bar is readily taken from the mold with its handle rigidly attached and projecting as shown in Figure 6.

By the provision of solder bars having handle elements as shown, it is possible to use all the solder of a given bar, and unnecessary, at any time, to bring the flame too close to the hand. Moreover, less oscillation or rotation of the bar is required for applying it to the flame due to the use of a triangular cross section.

Accordingly, the present invention affords considerable saving in solder since there is no scrap. It also effects a noticeable saving in time, due to the fact that the solder can be melted from the bar much more rapidly. This is of great importance in connection with the current uses of solder where large quantities must be deposited, as has been stated, in filling dents in sheet metal parts.

Having described my invention, I claim:

1. A mold for forming solder bars and securing wire handles axially in the ends of the bars comprising, a rectangular body member having a plurality of open grooves forming mold cavities on the upper face thereof, an end wall at one end of said cavities, a partial end wall at the opposite end of said cavities, and a removable supplemental end gate positioned on said partial end wall so as to provide a closure for said grooves, said partial end wall and supplemental end gate having a plurality of semi-circular grooves in registry, and adapted to engage around the wire handles extending into the mold grooves.

2. A plate for casting solder bars, said plate having a plurality of V-grooves of substantial depth located therein, a fixed dam at one end of the V-grooves and a split dam at the opposite end of the groove, the split dam comprising a fixed section and a separable section, the two sections configurated at the joining line to provide apertures thru which the handles of the solder bars project into the grooves, and are held during molding of the solder within the grooves.

3. A mold for forming bars of solder and means for securely clamping wire handles within said mold to secure the handles to the bars of solder comprising, a body having a plurality of open V-shaped grooves on the upper face thereof, an end wall at one end of said grooves, a partial lower end wall at the opposite end of the grooves and a separable end closure gate mounted above said partial lower end wall, said end closure gate and lower end wall having complementary lower and upper grooves for clamping a plurality of wire handles extended within the mold, said end closure gate having a pivotal mounting at one end and a clamping member at the opposite end adapting it to close the ends of the grooves, and at the same time to clamp the wire handles in place extended within the mold grooves.

4. A mold for forming solder bars and securing wire handles axially in the ends of the bars comprising, a body member having a plurality of longitudinal grooves in one face thereof, said grooves adapted to receive poured solder, a wall for damming said grooves at one end of the body member, said wall including means for holding said handles in position projecting axially into the respective grooves whereby the solder, when poured, will be distributed around the ends of said handles.

5. A mold for forming solder bars and securing handles axially in the ends of the bars comprising, a body member having a plurality of longitudinal grooves in one face thereof, said grooves adapted to receive poured solder, an end wall partially damming the grooves at adjacent ends thereof, a gate adapted to engage upon said wall for additionally damming the ends of the grooves and for clamping the handles in position extending axially into the respective grooves.

CHARLES E. BURKE.